Nov. 27, 1934.          C. H. HAPGOOD                1,982,299
                         BELT TIGHTENER
                       Filed Oct. 7, 1931          2 Sheets-Sheet 1
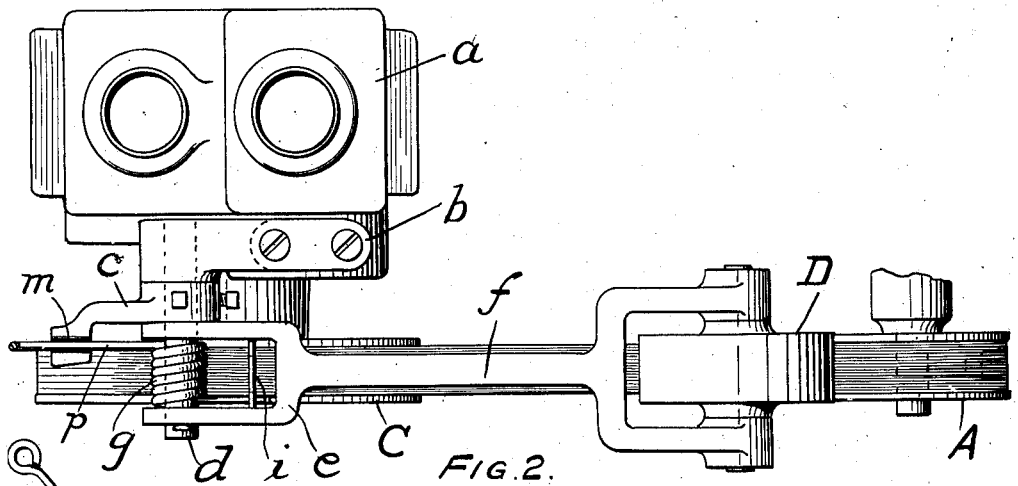
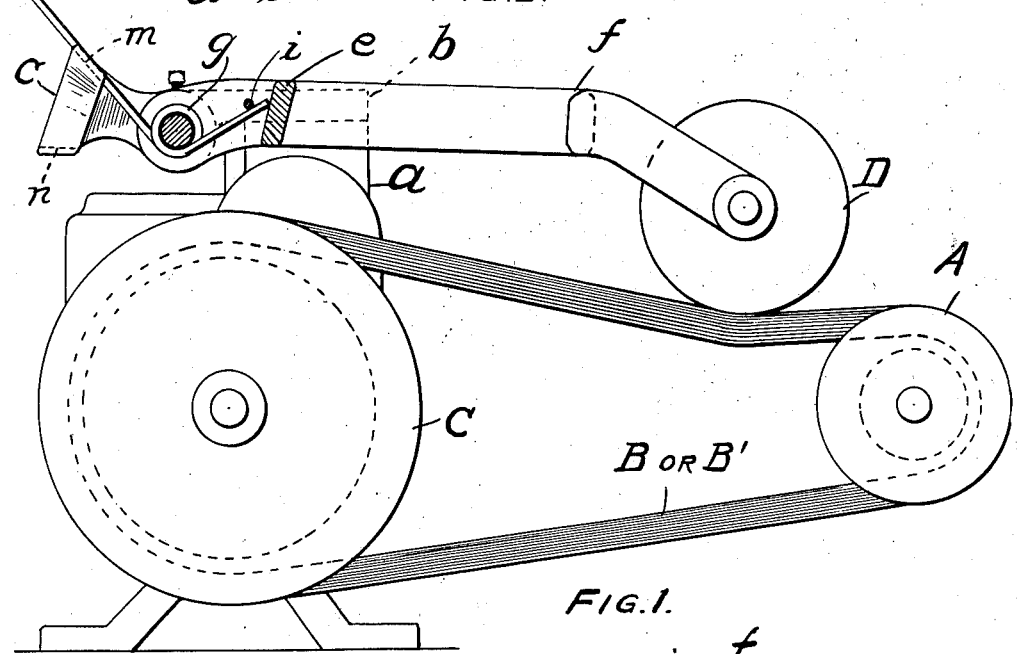
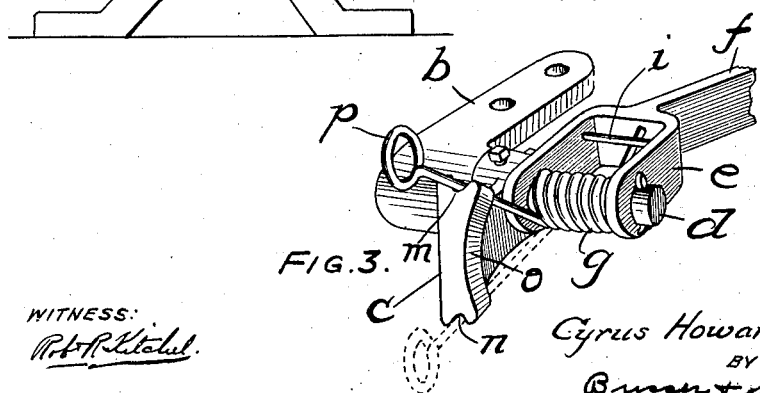
INVENTOR
Cyrus Howard Hapgood
BY
ATTORNEYS Nov. 27, 1934.  C. H. HAPGOOD  1,982,299
BELT TIGHTENER
Filed Oct. 7, 1931  2 Sheets-Sheet 2

WITNESS:

INVENTOR
Cyrus Howard Hapgood
BY
ATTORNEYS.

Patented Nov. 27, 1934

1,982,299

UNITED STATES PATENT OFFICE 1,982,299

BELT-TIGHTENER

Cyrus Howard Hapgood, Nutley, N. J., assignor to The De Laval Separator Company, New York, N. Y., a corporation of New Jersey Application October 7, 1931, Serial No. 567,338

4 Claims. (Cl. 64—5)

In the operation of belt drives it is of decided advantage, especially in and just after starting, to allow a variable degree of belt slippage until the engine is operating under normal working conditions. This provision is not only desirable, but is quite necessary when the temperature is low and the lubricant is not free flowing. The degree of belt slippage should be under control of the operator. The desired condition is not difficult of attainment, with an ordinary flat belt, by the use of known belt-tighteners; but with a V-belt, the ordinary belt-tightener cannot be successfully employed and belt manufacturers in general assert that the controllable slippage of a V-belt cannnot be successfully effected. The difficulty of providing a workable belt-tightener for V-belts is augmented by the fact that the conditions that produce slippage in thick V-belts are quite different from these which produce slippage in thin V-belts, which will be hereinafter explained in detail.

The object of the invention is to provide a belt-tightener for use with V-belts whereby a maximum or minimum of belt slip may be obtained regardless of the thickness of the belt.

In the drawings:

Figs. 1, 2 and 3 show the mechanical construction of the tightener; Fig. 1 being a side view showing the same, in tightening position, applied to a belt, Fig. 2 a plan view, and Fig. 3 a perspective view.

Fig. 4 showing a thick V-belt and Fig. 5 a thin V-belt.

Figure 4:
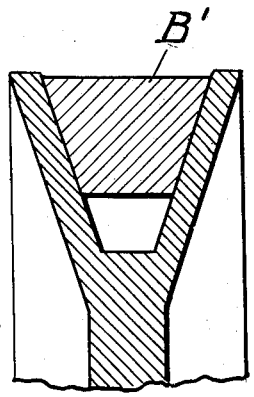
Figs. 4 and 5 are cross-sections through a driving or driven pulley and the belt engaging such pulley.
Figure 5:
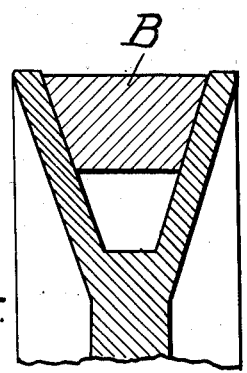
Figure 6:
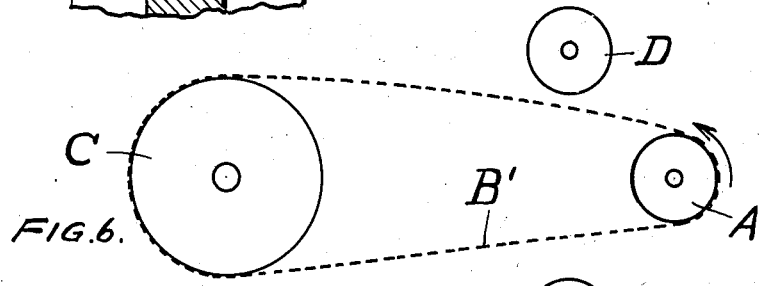
Figs. 6, 7, 8 and 9 are diagrammatic views showing the pulley of the belt-tightener in positions operative when applied to thick and thin belts respectively.
Figure 7:
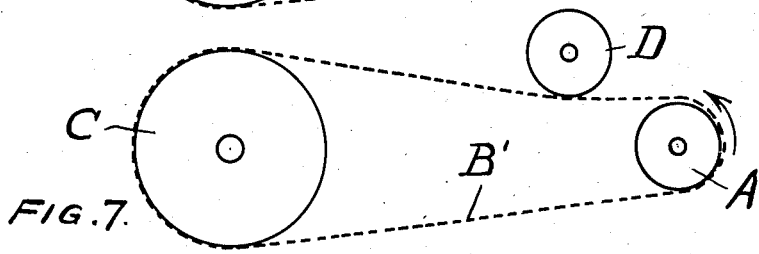
Figure 8:
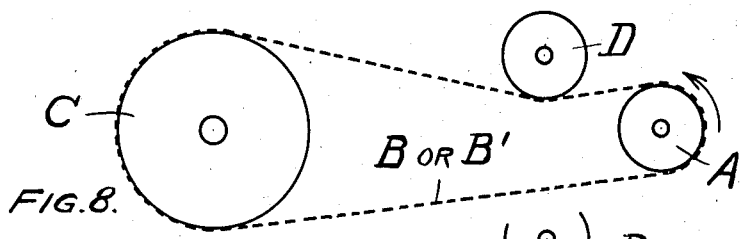
Figure 9:
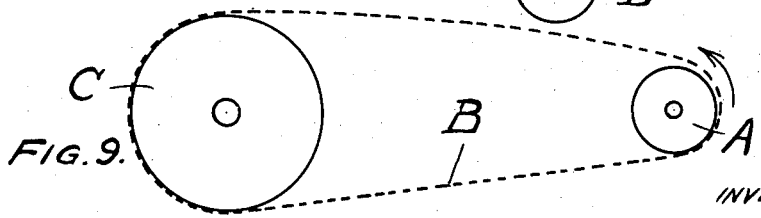

In order that the difficulty of providing a belt-tightener that will function efficiently, regardless of the thickness of the belt, may be appreciated, reference may be made to the diagrammatic Figs. 4 to 9 inclusive. Assume that A is the driving pulley, B a thin belt, B' a thick belt and C the driven pulley. A belt-tightening pulley D positioned as in Fig. 8 may be assumed to be in the position required to maintain the belt, whether thick or thin, in position to prevent any substantial slippage and maintain a drive approximating an efficiency of say about 99%. If the pulley D be lifted to the position shown in Figs. 6 and 9, there will be a limited belt slippage in the case of a thick belt B', a drive of about 75 to 95% efficiency being maintained, as illustrated in Fig. 6; but in the case of a thin belt B, the belt will assume such relation to pulley A that its driving efficiency will vary from zero to 10%, as illustrated in Fig. 9. If, however, the pulley D be shifted to the position shown in Fig. 7, a thick belt B' will have its upper reach bent to a degree substantially less than that required to enable it to function to drive, the driving efficiency being reduced to from zero to 10%; but the driving efficiency of a thin belt will not be affected to the same degree. It will thus be understood that a belt-tightening pulley may be in one position which allows maximum slip for a thin belt but not for a thick belt, while it may be in another position which allows maximum slip for a thick belt but not for a thin belt. It is possible, however, to provide for the belt-tightening pulley a position, as illustrated in Fig. 1 and diagramed in Fig. 8, which is a driving position for both thick and thin belts and to provide different other positions of the belt-tightening pulley which will allow the belt to have from 90 to 100% slip, each position depending on the thickness of the belt.

A supporting block $a$, which may carry a bearing for the driven pulley C, has secured thereto a bracket $b$ carrying a pin $d$ on which is pivoted one forked end $e$ of a lever $f$ whose other forked end carries the pulley D.

Coiled around pin $d$ is a spring $g$, one end of which is confined between the lateral wall of the fork $e$ and a cross pin $i$ extending between the arms of the fork $e$.

Secured on the pin $d$ between bracket $b$ and lever $f$ is a frame $c$ extending back of the pin and having a lateral flange whose upper and lower edges are provided with recesses $m$ and $n$ respectively whose side edge $o$ is concave. The rear end of spring $g$ is extended to form an arm $p$ which may be manipulated by hand to be positioned either in the upper recess $m$ as shown in Figs. 1, 2 and 3, or in the lower recess $n$ as shown in dotted lines in Fig. 3, or in an intermediate position, namely, in the concavity $o$.

When the arm $p$ of the spring $g$ is positioned as shown in Fig. 3, the pulley D is in position to tighten the belt, regardless of whether the belt be thick or thin, so as to drive with maximum efficiency. When the arm $p$ is moved by hand into engagement with the lower recess $n$ the pulley is in its idle position, and if a thin belt B be used, the belt will have from 90 to 100% slip. When the arm $p$ is moved into the concavity $o$, the pulley is in position, if a thick belt be used, to allow the belt to have from 90 to 100% slip.

The belt-tightener apparatus is thus adapted for use regardless of the thickness of the belt.

It will be understood that the specific construction shown is one adapted for use when the belt is driven in the direction indicated by the arrows. If the belt be driven in the opposite direction the belt-tightener obviously should be inverted and be made engageable with the lower reach of the belt. It is obvious, also, that the specific construction shown and described is capable of modification without departure from the principle of the invention.

The difficulty of providing a belt which may be made to carry approximately 99% full load or allow a slip of 90 to 100% is greatest in the case of a thick belt. In my improved belt tightener the desired result is accomplished, not by moving the belt into respectively belt-tightening and idle positions, but in varying the degree to which the belt is tightened or deflected, as illustrated in Figs. 7 and 8; a slip of from 90 to 100% being secured, as shown in Fig. 7, not by moving the pulley D into an idle position but into a position wherein it deflects the belt to a limited degree, whereas a complete disengagement of the pulley from the belt would result in the belt carrying a minimum load of at least 75%, which would not accomplish the purpose of the invention.

What I claim is:

1. In a belt-tightener for V-shaped belts, the combination with a driving pulley, a driven pulley, both having V grooves, and a connecting V-belt, of a belt-tightener comprising a pin, a lever pivoted on the pin, a pulley carried by the lever and adapted to be engaged with one reach of the belt, a spring coiled about the pin, an extension on one end of the spring adapted to fulcrum on said lever, a manually operable extension on the other end of the spring adapted to be moved into position to hold the belt-tightener in one position which is operative to maintain the belt in normal driving relation with the driving and driven pulleys regardless of the thickness of the belt and to be moved into position to render the belt-tightener inoperative to maintain the belt in said normal driving relation, and a frame adapted to engage the last-named spring extension and hold the belt-tightener in either position.

2. In a belt-tightener for V-shaped belts, the combination with a driving pulley, a driven pulley, both having V grooves, and a connecting V-belt, of a belt-tightener comprising a pin, a lever pivoted on the pin, a pulley carried by the lever and adapted to be engaged with one reach of the belt, a spring coiled about the pin, an extension on one end of the spring adapted to fulcrum on said lever, a manually operable extension on the other end of the spring adapted to be moved into position to hold the belt-tightener in one position which is operative to maintain the belt in normal driving relation with the driving and driven pulleys regardless of the thickness of the belt and to be moved into position to render the belt-tightener inoperative to maintain said normal driving relation, and a frame provided with upper and lower notches and a concavity between them, the last-named spring extension being adapted to be engaged with either recess or with said concavity, one of said recesses being so positioned as to maintain the belt tightener in the driving relation specified.

3. In a belt-tightener for V-shaped belts, the combination with a driving pulley, a driven pulley, both having V-grooves, and a connecting V-belt, of a belt-tightener comprising a pin, a lever pivoted on the pin, a pulley carried by the lever and adapted to be engaged with one reach of the belt, a spring coiled about the pin, an extension on one end of the spring adapted to fulcrum on said lever, a manually operable extension on the other end of the spring adapted to be moved into one position to impose a tension on one reach of the belt adapted to maintain the belt in normal driving relation with the driving and driven pulleys, regardless of the thickness of the belt, into another position, further from a line connecting the axes of the driving and driven pulleys, imposing a lighter tension on said reach of the belt adapted to allow maximum slippage of a relatively thick belt, and into a third position sufficiently still further from a line connecting the axes of the driving and driven pulleys to disengage the pulley from said reach of the belt to allow maximum slippage of a relatively thin belt, and a stationary frame with which said manually operable spring extension is adapted to be engaged to thereby hold said lever and pulley in any of the three operative positions specified.

4. In a belt-tightener for V-shaped belts, the combination with a driving pulley, a driven pulley, both having V-grooves, and a connecting V-belt, of a belt-tightener comprising a pin, a lever pivoted on the pin, a pulley carried by the lever and adapted to be moved into a plurality of positions in engagement with, and into a position out of engagement with one reach of the belt, a spring coiled about the pin, an extension on one end of the spring adapted to fulcrum on said lever, a manually operable extension on the other end of the spring adapted to move said pulley into the respective positions specified, and a stationary frame engageable by said spring extension and adapted to hold it in the position into which it moved.

CYRUS HOWARD HAPGOOD.